June 28, 1949.　　　DE WITT R. GODDARD　　　2,474,663
REMOTE-CONTROL SYSTEM FOR SELECTIVELY CONTROLLING
A PLURALITY OF ADJUSTABLE ELEMENTS
Filed Dec. 11, 1944　　　　　　　　　　　4 Sheets-Sheet 3

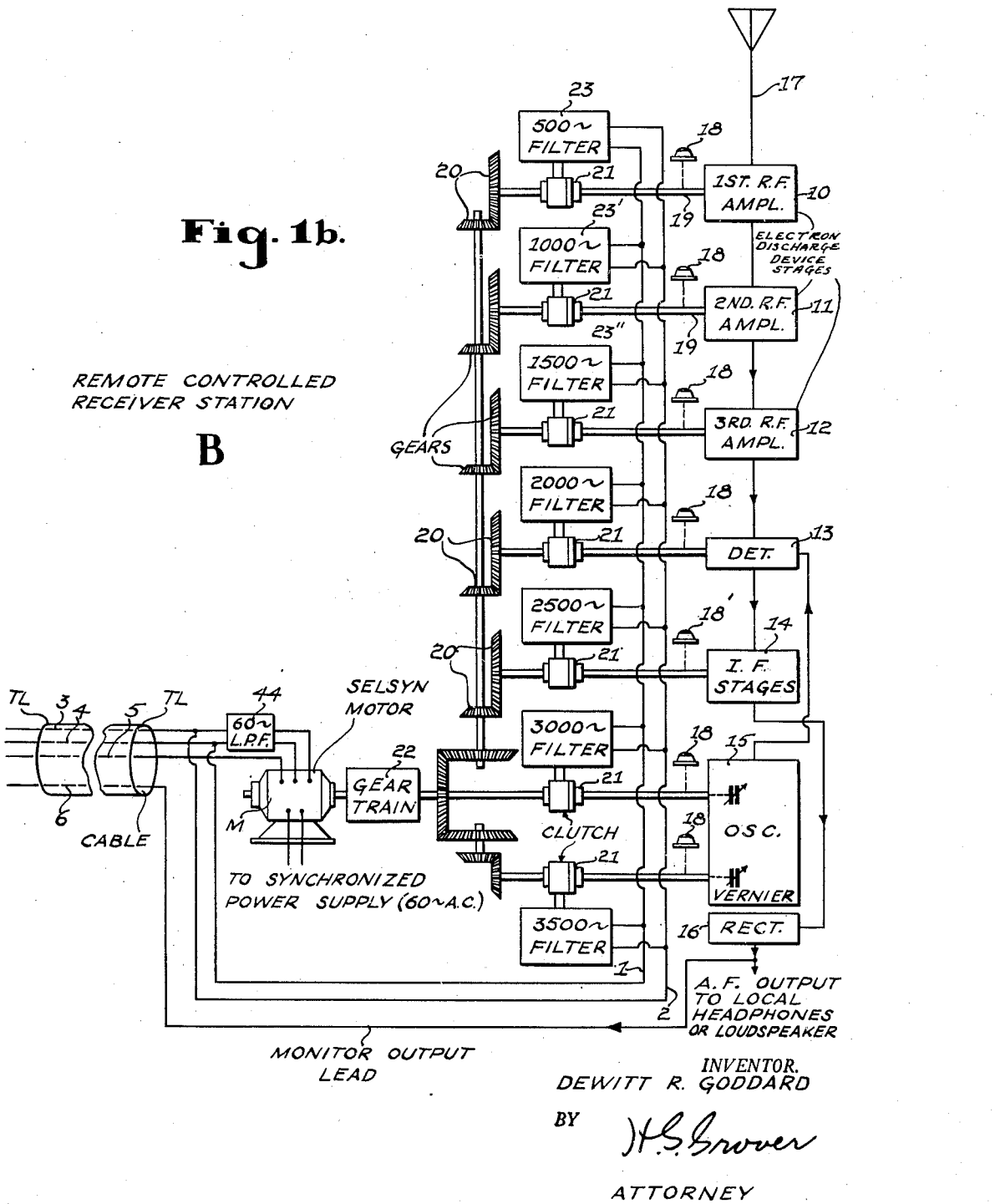

INVENTOR.
DEWITT R. GODDARD
BY
H.S. Grover
ATTORNEY

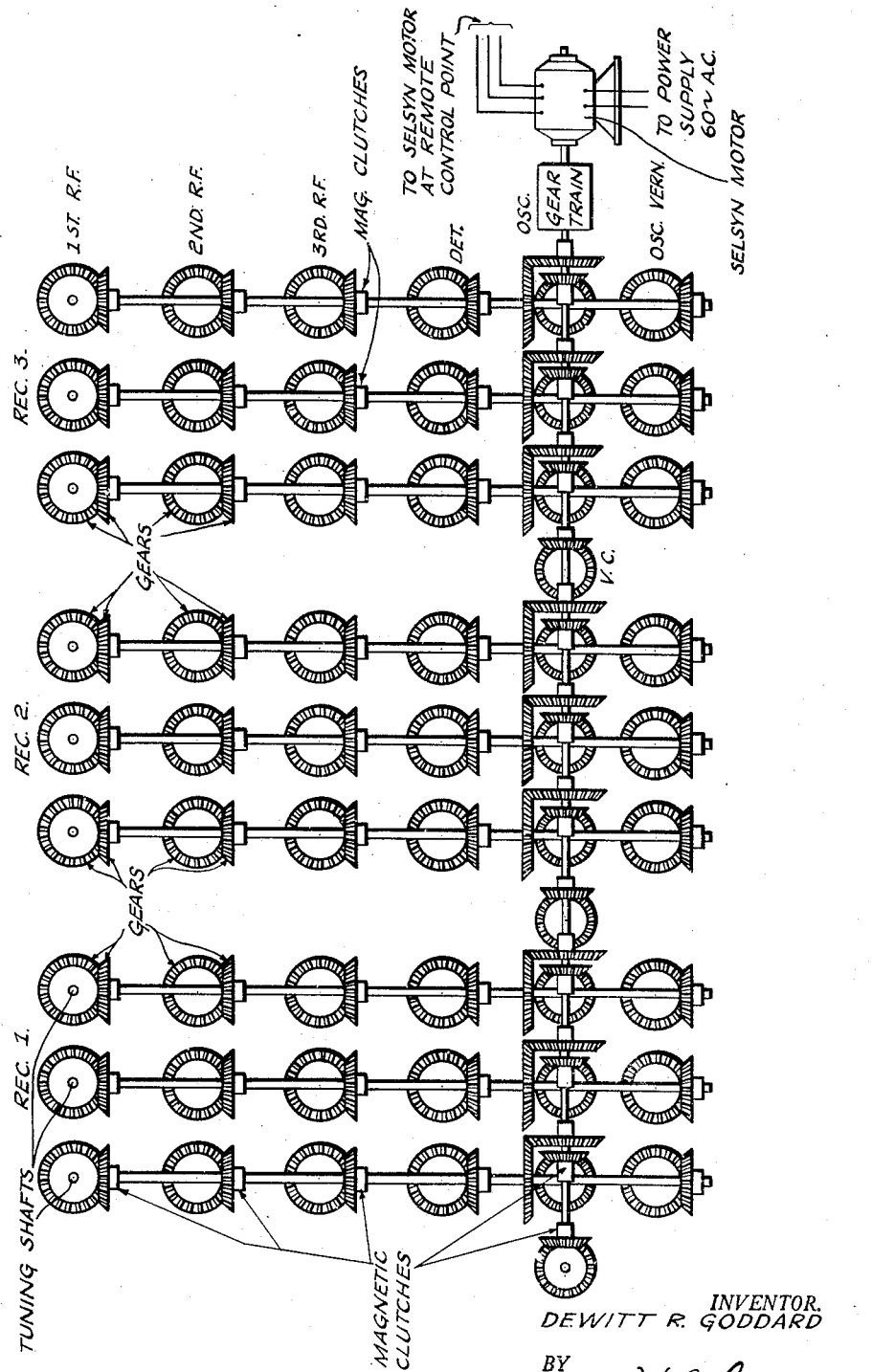

Patented June 28, 1949

2,474,663

UNITED STATES PATENT OFFICE 2,474,663

REMOTE-CONTROL SYSTEM FOR SELECTIVELY CONTROLLING A PLURALITY OF ADJUSTABLE ELEMENTS

De Witt Rugg Goddard, Riverhead, N. Y., assignor to Radio Corporation of America, a corporation of Delaware Application December 11, 1944, Serial No. 567,732

16 Claims. (Cl. 250—40)

1

This invention relates generally to remote control systems, and more particularly to a novel method of and apparatus for individually controlling a plurality of remote adjusting mechanisms.

An object of the present invention is to enable individual adjustments of a plurality of stages of a receiver from a remote control point.

Another object is to enable the selective control of a plurality of remotely located adjusting mechanisms by way of a common drive motor.

A further object is to provide means for selectively linking the tuning controls of a multi-stage communications receiver to a common rotating drive mechanism.

A still further object is to provide a plurality of control shafts adapted to be linked to a common driving motor or gear arrangement and means for selectively connecting in operative relation any one control shaft to the common driving motor gear arrangement.

A still further object is to provide means for enabling individual adjustments of a plurality of stages of any receiver unit of a multi-receiver unit diversity receiver.

According to a specific embodiment of the present invention, given by way of example only, a pair of coupled Selsyn motors are used for enabling the selective control from a central station of any one of a plurality of adjusting mechanisms at a remotely located receiver system. One Selsyn motor is located at the central station, while the other Selsyn motor is located at the remote receiver system. The controls at the central office are in the form of dials and are selectively linked by means of shafts to the associated Selsyn motor, depending upon which one of a plurality of switches is closed, while the adjusting mechanisms at the remote receiver system are adapted to be selectively linked in operative relation to the other Selsyn motor. Means are provided for enabling a particular dial at the central station to control a particular adjusting mechanism at the receiver.

A feature of the invention lies in the arrangement employed for locking the dials at the central station and for unlocking only that dial which it is desired to utilize at any one time.

Another feature lies in the circuit arrangement employed for utilizing the same wires which couple the two Selsyn motors together for the purpose of selecting the adjusting mechanism to be operated at the remote receiver.

A more detailed description of the invention follows in conjunction with a drawing, wherein:

2

Figs. 1a and 1b, taken together, illustrate, by way of example only, one embodiment of the invention;

Fig. 2a illustrates an alternative circuit scheme which can be used at the control office to replace Fig. 1a;

Fig. 4 diagrammatically illustrates the gearing arrangement for enabling the control of the different stages of the receivers of a remotely located diversity receiver.

Figure 1A:
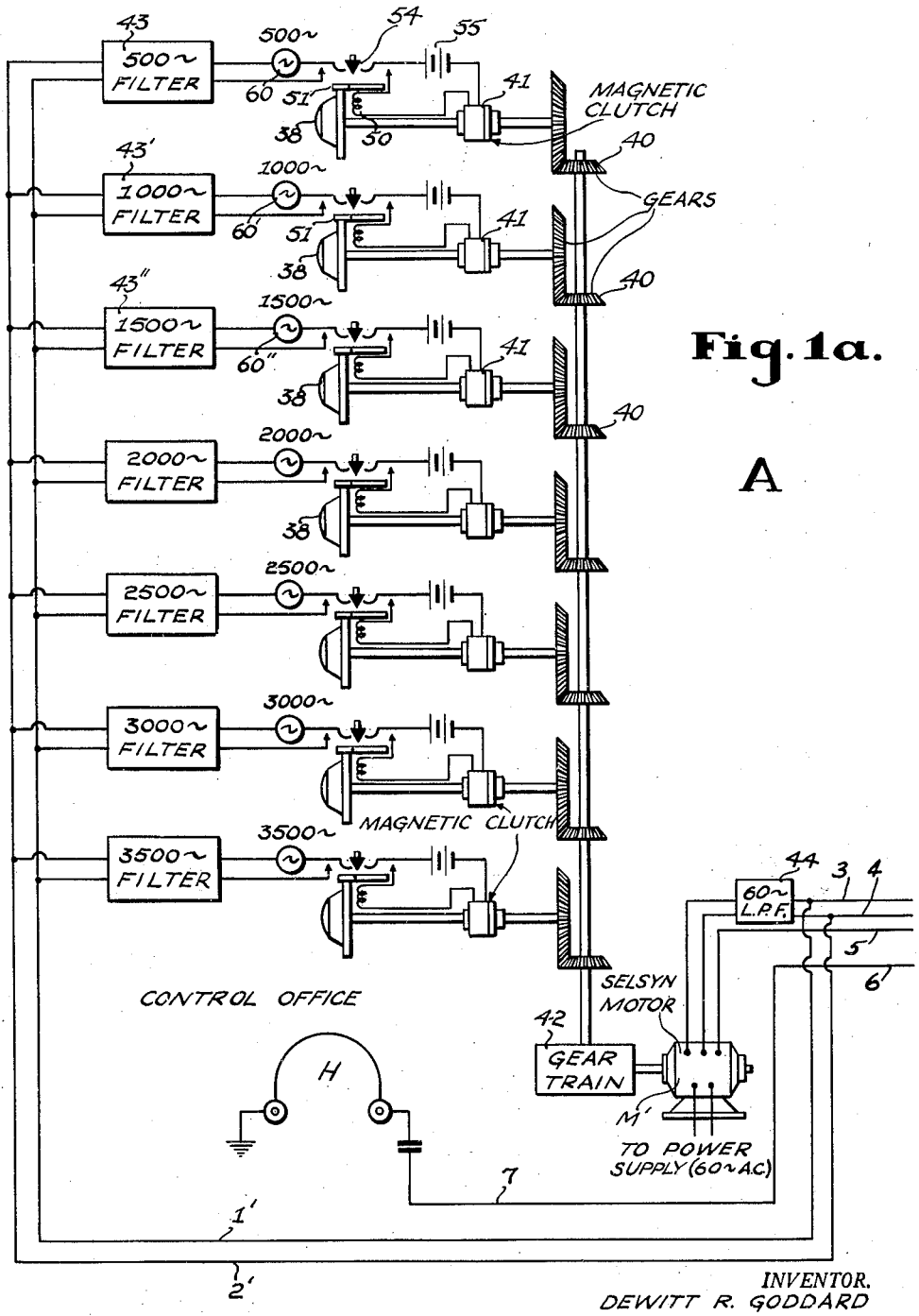

Referring to Figs. 1a and 1b in more detail, there is shown a system in accordance with the invention for remotely controlling a receiver station B from a central or control office A. Stations A and B are separated an appreciable distance, for example, ten miles or so, and are connected together by means of a plurality of wires in a cable TL. The receiver station at B comprises, by way of example only, a superheterodyne receiver having a first radio frequency amplifier 10, a second radio frequency amplifier 11, a third radio frequency amplifier 12, a detector 13, intermediate frequency stages 14, a heterodyne oscillator 15, and a rectifier 16. An antenna 17 serves to collect the signal energy and to feed it to the first radio frequency amplifier 10. The apparatus 10—16, inclusive, has been shown diagrammatically in box form and may comprise suitable electron discharge devices for performing the functions designated in the boxes. Apparatus 10, 11, 12, 13 and 15 are each provided with suitable tuning controls illustrated diagrammatically only by means of dials 18. Apparatus 14 is assumed to have a fixed tuning adjustment but is provided with a volume control illustrated diagrammatically by dial 18'. These dials are linked to suitable shafts 19. The oscillator 15 is provided with two dials, one comprising the main tuning dial for rough adjustment of the frequency, and the other provided with a vernier control for a finer adjustment of the frequency. Each of the shafts 19 is connected to a beveled gear arrangement 20 by means of a magnetic clutch 21. The beveled gears 20, 20 are driven from a common gear train 22, in turn, linked to a Selsyn motor M. The magnetic clutches 21 are so arranged that normally the control shaft 19 is not operatively connected to the beveled gears 20, and is only linked to the common drive shaft for operation thereby upon the energization of the clutch 21. The clutches 21 are individually connected through single frequency filters 23, 23', 23'' etc. to a pair of leads 1 and 2 which connect to the leads 3 and 4 of the cable TL. The filters 23, 23' and 23'' etc. are designed to selectively pass different frequencies. For example, the filter 23 will pass a 500 cycle tone, the filter 23' will pass a 1000 cycle tone, the filter 23'' will pass a 1500 cycle tone, while the other filters associated with the other magnetic clutches pass different tonal frequencies which are separated from one another by 500 cycles, more or less. This 500 cycle tone separation between one filter and the next filter is given by way of example only, since any suitable frequency separation may be employed.

The Selsyn motor at the receiver B is connected by means of three leads 3, 4, 5 of the cable TL to the Selsyn motor M' at the control office A. No claim is being made to the Selsyn motors per se, since these are well known in the art. As is known, each Selsyn motor is a single phase alternating current fed motor having three stator windings and one rotor winding. The rotor winding is fed with a suitable low frequency alternating current power source, for example 60 cycles. The three stator windings of the Selsyn motor M are connected by the three leads 3, 4 and 5 to corresponding points on the three stator windings of the controlling Selsyn motor M'. The same alternating current power supply is used to feed the rotor windings of both Selsyn motors M, M'; or in the alternative, the power supplies for these two motors should have the same frequency and be suitably synchronized to supply energy of identical phase to both Selsyn motors.

With such an arrangement, any motion of the drive shaft of the controlling Selsyn motor M' will produce a corresponding movement of the controlled Selsyn motor M. In the particular embodiment shown in Fig. 1, the controlling Selsyn motor M' has its shaft rotated through gear train 42 and gears 40 from a desired dial 38, in order to provide a corresponding movement of the remotely located controlled Selsyn motor M, to thereby produce corresponding motion at the receiver station of the gears 20 through the gear train 22 and thus control a selected shaft 19 in a manner described in more detail hereinafter. Gear trains 42 and 22 are similar in construction in order to assure that motion of any one set of gears 40 at the control office will produce corresponding or identical motion of the gears 20 at the remote receiver.

At the control office A, there are provided separate controls in the form of dials 38 for individually controlling the adjustment mechanisms at the remote receiver station B. Each of the dials 38 is connected by a shaft and a magnetic clutch 41 to beveled gears 40. These beveled gears are all linked to a common gear train 42, in turn connected to the shaft of the Selsyn motor M'. Normally, the dial 38 is not operatively linked to the gears 40 and requires the energization of the magnetic clutch 41 to connect the shaft of the dial 38 through to the beveled gears 40. It will thus be seen that at the control office A there are a plurality of dials provided, one for each control at the receiver. Each of the dials 38 has a lock or clamp mechanism which is mechanically released when it is desired to use the dial.

Figure 2:
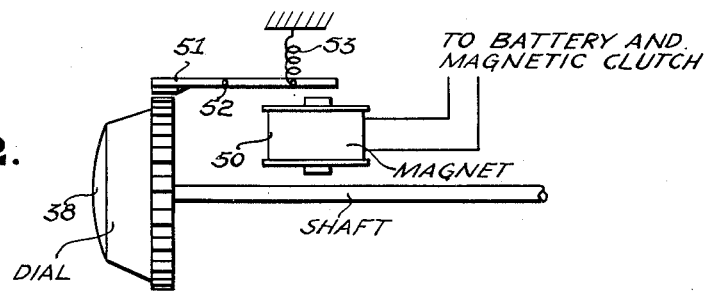
Fig. 2 illustrates a detail of the dial locking mechanism at the central station.

This lock or clamp mechanism is indicated in more detail in Fig. 2 and comprises a magnet 50 and a locking bar 51 which is pivoted at 52 and normally forced against the dial 38 by means of a strong spring 53. The operation of the magnet 50 will pull the right end of clamp 51 down against the force exerted by the spring 53 and release the dial 38 for movement to rotate the shaft. The dial 38 is preferably provided with notches, as shown, so as to insure positive locking when the magnet 50 is unenergized. In order to actuate the magnet 50, there is provided a suitable push button 54 which when pressed will connect certain contacts to complete an obvious path from both terminals of the battery 55 through the magnet 50 in series with its associated magnetic clutch 41.

In circuit with the controlling dials 38 at the control office A, there are provided individual tone generators 60, 60', 60'', supplying different tonal frequencies with are separated from each other by 500 cycles. This frequency separation, it should be noted, is the same as the frequency separation of the single frequency filters at the remote receiving station. The generators 60, 60', 60'' etc. are coupled through single frequency filters 43, 43' and 43'' etc. to leads 1' and 2', in turn connected to the wires 3 and 4 of the cable TL. In order to prevent the tonal frequencies of 500 cycles to 3500 cycles illustrated in the drawing from reacting upon or affecting the Selsyn motors M, M' there are provided sixty cycle low pass filters 44 at both ends of the cable TL. Filters 44 prevent the passage of any frequency other than the sixty cycle frequency from passing on to the Selsyn motors via leads 3 and 4. It will thus be noted that the leads 3 and 4 serve the dual purpose of enabling the control of the Selsyn motor M from the Selsyn motor M' and also passing the tonal control frequencies from the control office to the remote receiver station.

In order to operatively connect any one dial 38 at the control office A to the common drive gear train 42, it is necessary to push the desired button 54. When this button is pushed, two pairs of contacts are closed. One pair of contacts will release the locking mechanism on the dial 38 and will energize the clutch 41, thus operatively linking the dial 38 through its shaft to the gears 40. The other pair of contacts closed by pushing the button 54 will connect the output of the tone generator through its associated filter to the leads 1' and 2' for transmitting the selected tone over the leads 3, 4 of cable TL to the remote receiver station where this tone will be passed by only one of the filters (23, for example) in order to actuate the selected magnetic clutch 21 at the receiver and operatively link a particular tuning control or adjustment mechanism at the receiver to the Selsyn motor M.

In order to enable the attendant at the control office A to monitor the output of the remote receiver B, there is provided at the control office a suitable electroacoustic transducer such as a pair of headphones H which is connected by lead 7 and wire 6 of the cable TL to the audio frequency output of the rectifier 16.

The operation of the system of Figs. 1a and 1b will now be given. Let us assume that it is desired to tune the radio frequency amplifier 10 at the receiver, and that the control mechanism at the control office A for the remote amplifier 10 is the uppermost dial 38 having in circuit therewith the 500 cycle tone generator 60. In order to tune the receiver amplifier 10, the push button 54 at the control office A will be depressed in order to operate the clutch mechanism 41 and release the dial locking mechanism. The operation of the push button 54 will connect the dial 38 to the gears 40 and through the gear train 42 to the Selsyn motor M'. Simultaneously therewith, the tone generator 60 will be operatively coupled through the 500 cycle filter 43 to the leads 3 and 4 of the cable TL. This 500 cycle tone will pass over leads 1 and 2 at the receiver to the 500 cycle filter 23 at the receiver, thus energizing magnetic clutch 21 and operatively connecting the shaft of the tuning mechanism of the amplifier 10 to the gears 20. Movement of the dial 38 at the control office A by the attendant will now cause the shaft of the Selysn motor M' to rotate, and produce corresponding rotation of the shaft of the Selsyn motor M at the remote receiver station. This movement of the Selsyn motor at the receiver station will be transmitted through gear train 22 and gears 20 to the shaft 19 of the tuning mechansim of the amplifier 10 and cause a change in the tuning of the amplifier by an amount corresponding to the movement of the dial 38 at the control office. In similar manner, any one of the tuning control or adjusting mechanisms at the receiver can be individually controlled by the corresponding control dial 38 at the control office. It should be understood, of course, that after each tuning adjustment is made, the push button 54 should be released so as to lock the dial mechanism and prevent accidental movement of the dial.

In order to assure the fact that the tuning dial 18 at the receiver corresponds in position to a parcular position of the control dial 38 at the station A, the attendant at the control office can quickly and simply check the fact that the two dials are in step in the following manner: By providing stops at the receiver so that the receiver dials cannot be rotated more than, say 180°, the dial 18 at the receiver can be revolved continuously in one direction by the attendant at the control office until the attendant feels that the receiver dial strikes its stop. At this time it should be noted that by virtue of the Selsyn motor mechanism, the attendant at the receiver can actually feel any resistance to his motion of the dial 38 which may be caused by stoppage of the motion of the corresponding tuning mechanism at the receiver. When the attendant at the control office feels that the receiver dial or selected shaft at the receiver has reached its extreme position as determined by the stop, the attendant can then set his dial 38 in the same position, thus bringing the control dial 38 and the receiver dial 18 into phase.

A simplification of Fig. 1a can be achieved by replacing the group of filters 43, 43', 43" etc. at the control office by a single 100 cycle high pass filter for preventing the tone sources from short-circuiting the 60 cycle voltage of the Selsyn motors.

Figure 2A:
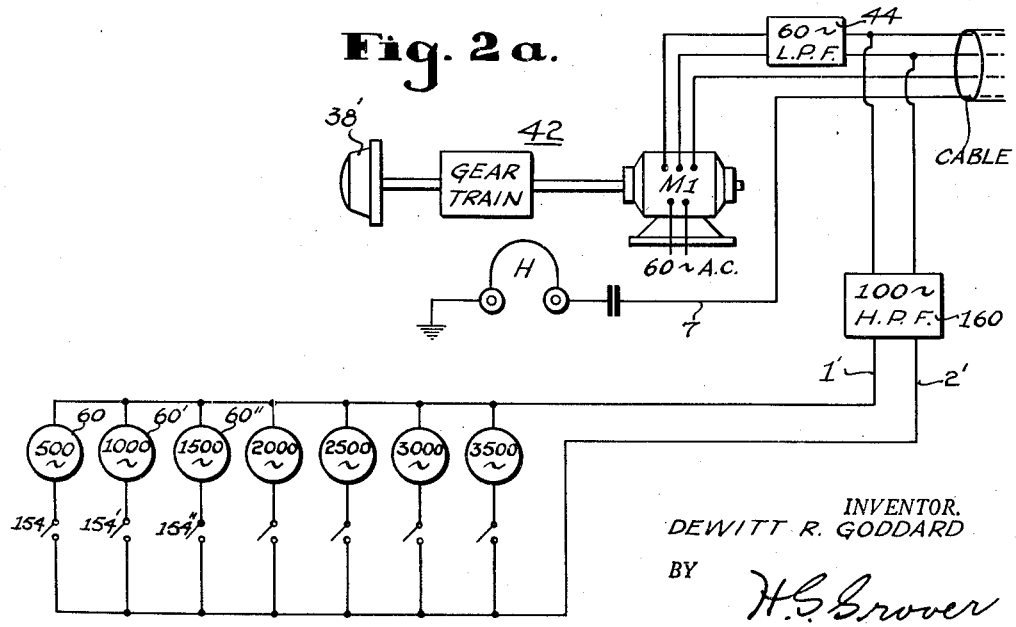

Instead of a separate knob 38 at the control office (Fig. 1a) for each tuning control of the receiver of Fig. 1b, a single knob may be employed. This can be done by substituting for all of Fig. 1a the apparatus shown in Fig. 2a. The tonal generators 60, 60', 60" etc. of Fig. 2a provide different frequencies to select the operation of differnt magnetic clutches 21 at the receiver of Fig. 1b in the same manner as the tonal generators having the same reference numerals described above in connection with Fig. 1a. The purpose of the single 100 cycle high pass filter 160 of Fig. 2a is to prevent the tone sources from short-circuiting the 60 cycle voltage of the Selsyn motor. When it is desired to operate a particular tuning control at the receiver, it is only necessary to close a particular switch 154, 154' or 154" etc. at the control office (Fig. 2a) in order to enable the tone from a particular source 60, 60', 60" etc. to operate a selected magnetic clutch 21 at the receiver. Calibration can be obtained from a chart and it is only necessary to adjust each knob at the receiver to be controlled by turning it to "zero" in the manner previously described. In this way the control office knob indicates faithfully the exact position of the knob at the receiver to be controlled.

Another simplification of the system of Figs. 1a and 1b can be achieved by replacing the filter mechanism and tonal oscillators by a notching relay or stepping magnet at the receiver and by another stepping magnet and a pulsing dial of the type known in the telephone practice at the control office. The stepping magnet at the control office will unlock the appropriate dial at the control office and connect the same to the Selsyn motor M'. The magnetic clutches 21 at the remote receiver would then be assigned different positions on the stepping magnet, which positions would require different pulses to be transmitted from the control office. Thus, one pulsing dial and one stepping magnet at the control office and one stepping magnet at the receiver would replace the different tone generators and filter apparatus shown in Figs. 1a and 1b.

Figure 3:
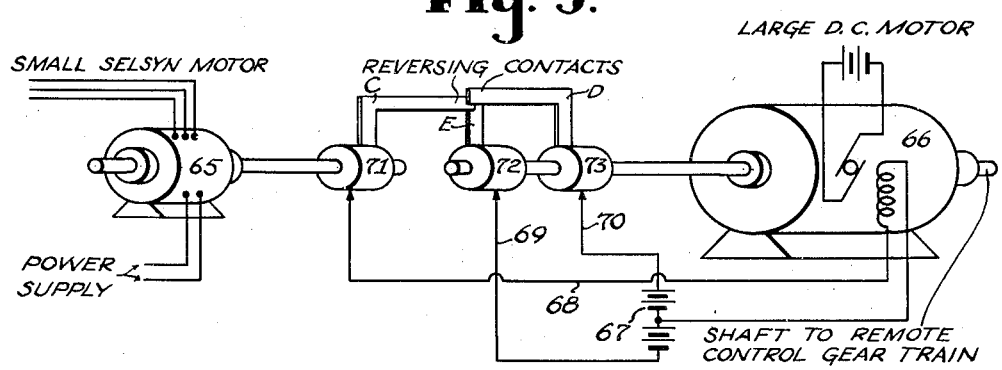
Fig. 3 illustrates a way of controlling a large direct current motor from a relatively small Selsyn motor.

Because of the fact that Selsyn motors of sufficient size to transmit the required torque for the arrangement of Figs. 1a and 1b may necessitate the transmission of considerable voltage over the control leads 3, 4 and 5 of the cable TL, Fig. 3 is given to illustrate one way in which smaller Selsyn motors can be employed to multiply the torque and overcome the need for relatively high voltage or power transmission at 60 cycles over the cable TL. In Fig. 3 there is shown a small Selsyn motor 65 which drives a contact arm C, the latter being sandwiched between two contact arms D and E mounted on the shaft of a considerably larger direct current motor 66. The field winding for the motor 66 is energized from a battery 67 via leads 68, 69 or 70 through the intermediary of slip rings 71, 72, 73. Contacts C, D and E represent a single pole double throw relay and are so arranged that when the Selsyn motor rotates in one direction the direct current motor field winding is energized with such a polarity as to make it rotate in the same direction. Whenever the Selsyn motor 65 stops rotating, the direct current motor 66 continues to rotate until the current carrying contacts separate and the arm C is substantially midway between arms D and E. The large direct current motor 66 can be used to drive the gear train in the receiver tuning unit.

Fig. 4 diagrammatically illustrates how the invention can be applied to control the different controls or adjusting mechanisms of a three-unit diversity receiver. As is known, a diversity receiving system comprises a plurality of radio antennas located at geographically spaced points feeding a plurality of centrally located receivers whose outputs are combined to overcome the effects of fading. Fig. 4 diagrammatically shows the tuning controls of three receivers, respectively labeled "Receiver 1," "Receiver 2," and "Receiver 3." Each of these receivers includes a first radio frequency amplifier, a second radio frequency amplifier, a detector and an oscillator. It should be noted that each of these elements is provided with a tuning control and that the oscillator is also provided with an oscillator vernier control. Each of these controls is also provided with beveled gears and a magnetic clutch arrangement. The apparatus for operating the magnetic clutch in order to select a desired tuning control mechanism is not shown because it follows the principles shown in Figs. 1a and 1b and it is not believed necessary to repeat the illustration of Fig. 1 for these elements. Each receiver unit has a separate receiver for each band of frequencies, thus in effect each receiver unit comprises three separated radio frequency receivers. The intermediate frequency stages of each of the three receiver units has not been shown because these are normally fixedly tuned. There are six separate controls for each frequency band in each receiver, and each of these separate controls will have a separate control dial at the control office. There are eighteen separate controls for each receiver unit or fifty-four separate controls for the three receiver units. If desired, there may be provided a volume control arrangement for the intermediate frequency stages, not shown. By way of example only, the three radio frequency receivers for each receiver unit in the diversity system of Fig. 4 may cover the following frequency bands: 3-6 megacycles; 6-12 megacycles; and 12-24 megacycles.

Having described my invention what I claim is:

1. In a remote control system, a control office, a radio receiver remotely located with respect to said control office, a multi-conductor cable connecting said control office and radio receiver, said receiver having a plurality of control shafts coupled to different tuning elements of the vacuum tube stages of said receiver, a motor, individual magnetic clutches and gears linking said control shafts to said motor, said clutches being so constructed and arranged that said shafts are operatively linked to said motor only upon energization of said clutches, and means for selectively energizing said clutches to thereby link a desired control shaft to said motor.

2. In a remote control system, a control office, a radio receiver having a plurality of control shafts, a motor, individual magnetic clutches and gears linking said control shafts to said motor, said clutches being so constructed and arranged that said shafts are operatively linked to said motor only upon energization of said clutches, and means including a plurality of tone generators at said control office and a plurality of filters at said receiver for selectively energizing said clutches to thereby link a desired control shaft to said motor.

3. In a remote control system, radio apparatus having a plurality of tuning controls, a common drive motor, a magnetic clutch and a gear mechanism between each control and said motor, individual filters having different selective frequencies for said clutches, a circuit coupled in common to all of said filters, and means located remotely relative to said radio apparatus for transmitting energy of the frequencies to which said filters are selective, whereby said clutches can be selectively operated to operatively link a desired control to said motor.

4. In a remote control system, a control office, a remote radio station having a plurality of control shafts, a common drive motor for said shafts, said control office having a corresponding number of control shafts and a common drive motor therefor at said control office, leads interconnecting said motors so as to control the motor at said radio station from the motor at said control office, and means for selectively connecting a desired control shaft at the radio station to its associated motor in response to movement of the corresponding control shaft at said control office.

5. In a remote control system, a control office and a remotely controlled station, a plurality of adjusting shafts at said station and a corresponding number of control shafts at said control office, a Selsyn motor at said station for driving said adjusting shafts, a Selsyn motor at said control office for driving said control shafts, leads interconnecting said Selsyn motors to enable movement of said motor at said control office to cause a corresponding movement of the motor at said station, individual electric clutch mechanisms between said shafts and their associated drive motors, and means for selectively energizing the electric clutch mechanism of a control shaft at the control office simultaneously with the energization of the corresponding clutch mechanism of an adjusting shaft at said station.

6. In a remote control system, a control office and a remotely controlled station, a plurality of adjusting shafts at said station and a corresponding number of control shafts at said control office, a Selsyn motor at said station for driving said adjusting shafts, a Selsyn motor at said control office for driving said control shafts, leads interconnecting said Selsyn motors to enable movement of said motor at said control office to cause a corresponding movement of the motor at said station, individual electric clutch mechanisms between said shafts and their associated drive motors, individual dials for said control shafts, individual locks for said dials, and means for selectively unlocking a desired dial and for energizing the electric clutch associated with its control shaft and for simultaneously energizing the corresponding clutch for an adjusting shaft at said station.

7. In a remote control system, a control office, a remote radio receiver having a plurality of different tuning elements selectively controlled by a plurality of control shafts, a motor, individual magnetic clutches and gears linking said control shafts to said motor, said clutches being so constructed and arranged that said shafts are operatively linked to said motor only upon energization of said clutches, and manually controlled means at said control office for transmitting pulsating current to said receiver to thereby selectively energize said clutches and link a desired control shaft to said motor.

8. In a remote control system, a multi-unit diversity receiver, each unit of which has a plurality of tuning control shafts, a common drive motor, individual magnetic clutches and gears linking said control shafts to said motor, said clutches being so constructed and arranged that a shaft is operatively linked to said motor only upon the energization of the associated clutch, and means for selectively energizing a clutch in response to a control from a remote point.

9. A remote control system comprising a plurality of control shafts, a common drive motor, electric clutch and gear mechanism individually coupling each control shaft to said drive motor, and means including sources of different frequency alternating currents located at a remote point and frequency selective filters at the location of said motor and control shafts for selectively energizing a desired clutch.

10. In a remote control system, a control office and a remote controlled station, a plurality of electrical mechanism adjusting shafts at said station, a Selsyn motor at said station for driving said shafts, individual electric clutches and gears between said shafts and said Selsyn motor, a Selsyn motor at said control office for controlling the movement of said first Selsyn motor, leads interconnecting both Selsyn motors, and means under control of said control office for selectively energizing a desired clutch to thereby operatively link its associated shaft to the motor at the controlled station.

11. In a remote control system, a control office and a remotely controlled station, a plurality of electrical mechanism adjusting shafts at said station, a Selsyn motor at said station for driving said shafts, individual electric clutches and gears between said shafts and said Selsyn motor, a Selsyn motor at said control office for controlling the movement of said first Selsyn motor, leads interconnecting both Selsyn motors, and means under control of said control office for selectively energizing a desired clutch to thereby operatively link its associated shaft to the motor at the controlled station, and dial and shaft mechanisms at said control office for controlling the movement of the Selsyn motor at the control office.

12. In combination, a pair of Selsyn motors located at remote points, leads interconnecting said motors so as to control one from the other, a plurality of control shafts individually linked through electric clutch and gear mechanism to the Selsyn motor at the controlled point, and means under control of apparatus at the remote point for selectively energizing a desired clutch at the controlled point.

13. In a remote control system, a receiver having a plurality of electron discharge device stages, individual tuned circuits for said stages, individual control shafts for varying the tuning of said tuned circuits, a motor, individual magnetic clutches and gears linking said control shafts to said motor, said clutches being so constructed and arranged that said shafts are operatively linked to said motor only upon energization of said clutches, and means including wave selective circuits for selectively energizing said clutches to thereby link a desired control shaft to said motor.

14. In a remote control system, a radio receiver having a plurality of control shafts, a motor, individual magnetic clutches and gears linking said control shafts to said motor, said clutches being so constructed and arranged that said shafts are operatively linked to said motor only upon energization of said clutches, and means for selectively energizing said clutches to thereby link a desired control shaft to said motor, said means including electrical filters of different electrical characteristics in circuit with the different magnetic clutches and connections for supplying said filters with a waveform of varying amplitude.

15. In a remote control system, a radio receiver having a plurality of control shafts, a motor, individual magnetic clutches and gears linking said control shafts to said motor, said clutches being so constructed and arranged that said shafts are operatively linked to said motor only upon energization of said clutches, and means for selectively energizing said clutches to thereby link a desired control shaft to said motor, said means including electrical filters of different electrical characteristics in circuit with the different magnetic clutches, connections paralleling the inputs of said filters and means for supplying said last connections with alternating current waves.

16. In a remote control system, radio apparatus having a plurality of controls, a common drive motor, a magnetic clutch and a gear mechanism between each control and said motor, each of said controls being normally disengaged from its associated gear mechanism, individual electrical filters having different selective electrical characteristics for said clutches, a common input circuit for all of said filters for supplying said filters with varying amplitude waves, whereby said clutches can be selectively operated to operatively link a desired control to said motor.

DE WITT RUGG GODDARD.

REFERENCES CITED

The following references are of record in the file of this patent:

UNITED STATES PATENTS

| Number | Name | Date |
| --- | --- | --- |
| Re. 15,924 | Sperry | Oct. 7, 1924 |
| 1,964,944 | Harwood | July 3, 1934 |
| 1,979,588 | Vreeland | Nov. 6, 1934 |
| 1,980,585 | Haberle et al. | Nov. 13, 1934 |
| 2,089,568 | Moore | Aug. 10, 1937 |
| 2,092,474 | Rodwin | Sept. 7, 1937 |
| 2,114,835 | Fouquet | Apr. 19, 1938 |